Dec. 24, 1963 P. F. BERGMANN ETAL 3,115,128

MECHANICAL SELF-ADJUSTING TAPPET

Filed Oct. 25, 1960 5 Sheets-Sheet 1

INVENTORS
PAUL F. BERGMANN
JOHN W. HUMPHREYS
MORRIS V. DADD

BY Price & Heneveld
ATTORNEYS

MECHANICAL SELF-ADJUSTING TAPPET

Filed Oct. 25, 1960 5 Sheets-Sheet 2

INVENTORS
PAUL F. BERGMANN
JOHN W. HUMPHREYS
MORRIS V. DADD

BY Price & Heneveld

ATTORNEYS

MECHANICAL SELF-ADJUSTING TAPPET

Filed Oct. 25, 1960 5 Sheets-Sheet 3

INVENTORS
PAUL F. BERGMANN
JOHN W. HUMPHREYS
MORRIS V. DADD

BY Price & Heneveld

ATTORNEYS

INVENTORS
PAUL F. BERGMANN
JOHN W. HUMPHREYS
MORRIS V. DADD

BY Price and Heneveld

ATTORNEYS

MECHANICAL SELF-ADJUSTING TAPPET

INVENTORS
PAUL F. BERGMANN
JOHN W. HUMPHREYS
MORRIS V. DADD
BY Price and Heneveld
ATTORNEYS

United States Patent Office 3,115,128

Patented Dec. 24, 1963

3,115,128

MECHANICAL SELF-ADJUSTING TAPPET

Paul F. Bergmann, North Muskegon, and John W. Humphreys and Morris V. Dadd, Muskegon, Mich., assignors to Johnson Products, Inc., Muskegon, Mich., a corporation of Michigan Filed Oct. 25, 1960, Ser. No. 64,803

13 Claims. (Cl. 123—90)

This invention relates to a self-adjusting tappet and more particularly to a mechanical, as opposed to hydraulic, self-adjusting tappet.

This application is a continuation-in-part of abandoned patent application Serial No. 11,755, filed February 29, 1960, and entitled Mechanical Self-Adjusting Tappet.

The efficient operation of internal combustion engines requires that the engine valves be opened and closed at specific times in the combusion cycle of the engine. Timing cams are normally used for this purpose. The timing cams are adapted to operate the engine valves through valve actuating mechanisms which engage and operate the valves. The valve actuating mechanisms and the other part of the engine closely associated therewith are subject to longitudinal expansion and contraction due to changing engine temperature and wear. Therefore, some means is required for compensating for this expansion and contraction. Otherwise the timing pattern set by the cams is not constant and the clearance between the valve actuating mechanism and valve causes what is generally known as tappet noises.

Hydraulic tappets are generally used to compensate for changes in the effective length of the valve actuating mechanism. Although hydraulic valve lifters are not entirely unsatisfactory for this purpose, there are many features of such tappets which are undesirable. Hydraulic lifters are dependent upon the supply of oil through passages of rather small dimensions. Due to this, it is necessary to use a high grade oil, and great care must be taken that the oil remains clean, otherwise the hydraulic valve tappets become clogged and fail to operate properly. Further, hydraulic tappets are expensive, both in the structure of the tappet itself, and in the structure which must be provided to supply oil thereto.

Mechanical self-adjusting tappets have been devised such as disclosed by the United States patents issued to Humphreys, No. 2,615,439, and Howard, No. 2,326,780. On such tappets the primary requisite is that regardless of conditions the tappet can be depended upon to maintain pressure contact between the tappet and the end of the push rod of overhead valve engines and between the tappet and the lower end of a valve stem in other internal combustion engines. Thus, it must extend and take up slack particularly when the engine is cold and must contract or yield, particularly when the engine warms up. We have found many constructions which will operate under certain conditions for some length of time but eventually they become undependable because they lock in extended position or will not extend when desired. Thus basically the difficulty encountered has been to develop a self-adjusting tappet that is dependable in the above respect after long use and under various conditions.

Another factor in developing self-adjusting tappets is that such tappets must be capable of economical manufacture as compared to hydraulic tappets. Thus extremely close tolerances must be cut to a minimum.

Therefore, an object of this invention is to provide a self-adjusting tappet that is economical to manufacture while at the same time is operably dependable, this object being accomplished by a novel but simple structure which includes a wedge element biased toward extended position against cam members which engage the push rod plunger. The wedge element is guided by a novel construction and has a wedge angle between 5 to 6½ degrees with respect to the vertical. Further, novel cam elements are provided in some embodiments of this invention. We have discovered that each of these features, alone or in combination, have decided advantages and produce results heretofore unappreciated and undiscovered by those skilled in the art of tappets.

Other objects coming within the scope of this invention will be readily seen upon reading the following specification in conjunction with the drawings.

Figure 1:
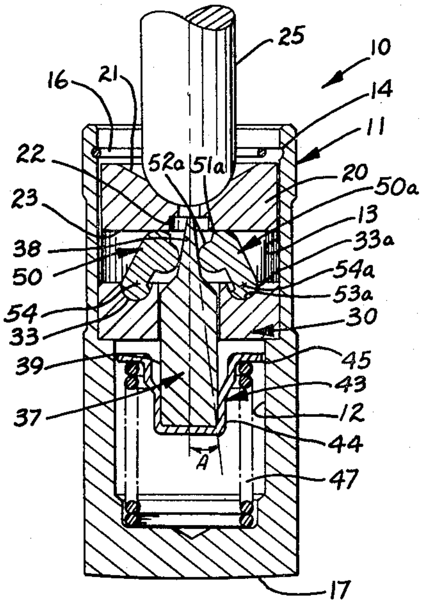
FIG. 1 is a side elevational view, taken in cross section, of the self-adjusting tappet showing the adjustment mechanism in an extended position.
Figure 4:
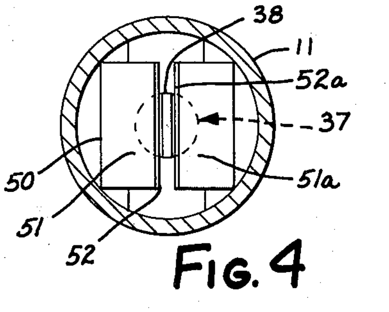
FIG. 4 is a cross sectional view taken along the section lines IV—IV of FIG. 2.

Basically, this invention relates to a self-adjusting valve tappet having mechanical means which adjust automatically for variations in the length of valve train mechanism. The valve tappet body is hollow and houses the self-adjusting mechanism.

A spring urged wedge element is slidably disposed within a guide member in the body of the valve tappet. The wedge member cooperates with cam members which are pivotally, slidably or rotatably mounted on the guide member depending on the type of cam member used. The cam members also have surfaces engaging a push rod plunger. Since the wedge member is wedge-shaped, extension thereof will cause the cam members to pivot, slide or roll due to the coaction of their surfaces with the wedge surface. Pivoting, sliding or rolling of the cam members as the wedge member extends causes the plunger to extend due to a coaction between surfaces on the cam members and the plunger. This in turn also causes the push rod to be extended. Thus, as the wedge member extends or retracts, the push rod is extended or allowed to retract by the cam members.

The wedge element has a wedge angle which ranges between 5 to 6½ degrees to the vertical. We have discovered this angle is critical because retraction of the wedge element by the cam member must occur only when the valve train mechanism is in dynamic or operating condition. If the angle is too small the wedge element will lock with the cam member preventing retraction or yielding of the wedge element. However, if the angle of the wedge blade is excessively great the wedge element will retract too quickly. When a length variation in the valve train mechanism results due to wear or temperature change, the spring allows expansion or retraction as needed, and thus it compensates for any lost motion which might exist in the valve train.

The wedge element is supported and guided at both the bottom and the top by a novel structure which stabilizes the movement thereof. This method of guiding the wedge element results in proper operation of the device.

The basic self-adjusting mechanical tappet assembly is designated generally as 10. This assembly includes the body 11, a guide and retainer block 30, cam members 50 and **50*a*, which are pivotally mounted on the guide block, a plunger 20 which is actuated by the cam members and reciprocates within the tappet body, and a wedge element or block 37, which is urged by a spring 47**.

The body 11 has a bore 12 which extends from one end thereof throughout substantially the entire length of the body. Thus, the body 11 has an open end and a closed end 17. A counterbore 13 extends from the open end for approximately one-half the length of the tappet body 11.

A shoulder 15 is formed at the point where the counterbore 13 terminates and the bore 12 continues. A groove 14 is formed in the counterbore 13, adjacent the open end of the tappet body 11. The groove 14 extends about the periphery of the counterbore 13 and is adapted to house the retainer ring 16, which seats therein. The purpose of the retainer ring 16 will be explained more fully hereinafter.

Fitted within the counterbore 13 and seated upon the shoulder 15 is a guide and retainer block 30. Block 30 has a centrally disposed guide passage 32 which guides the wedge element 37, to be more fully explained hereinafter. It is also substantially disk-shaped and has pivot pockets 33 and **33*a* formed in the upper flat surface thereof and spaced 180 degrees apart or diametrically opposite each other on the upper surface of the guide block. The pivot pockets 33 and 33*a* act as seats or retainers for cam members 50 and 50*a* which are pivotally mounted therein. The bottom of recess 22 in the lower portion of plunger 20 acts as a stop means for the wedge element 37. The tappet could be dimensioned such that the lower surface 34 of guide block 30 would act as a stop means for the wedge element 37**.

A wedge element 37 is slidably disposed within the guide passage 32 and directed thereby. The wedge element has a trunk 39 which conforms in shape to the shape of guide aperture 32. The upper end of the wedge element 37 is formed into a wedge blade 38. The wedge blade 38 tapers from a blunt point, gradually downward into the trunk 39 of the wedge element 37. Each side of the wedge blade 38 has cam engaging surfaces 40 and 41.

The blade angle A of the wedge element 37 has been found to be quite critical. If the slope of the cam engaging surfaces 40 and 41 is too small, the cam members tend to lock with the wedge element and prevent retraction of the wedge element. Thus, the tappet would fail to adjust properly upon expansion of the valve train unit. On the other hand, if the slope of the cam engaging surfaces

40 and 41 is excessively great the wedge element 37 has a tendency to yield too easily and spasmodically under pressure increases in the valve train mechanism rather than yielding only to vibrations and dynamic action applied by the valve train mechanism. We have found that proper operation is obtained with a wedge angle which ranges from between 5 to 6½ degrees with respect to an imaginary axis drawn through the longitudinal center of the wedge element.

The trunk 39 of the wedge element 37 is supported in a carriage 43. The carriage 43 is generally cup-shaped having a cup or seat portion 44 in which the wedge element snugly fits and is retained. The upper edge or lip of the cup is formed into a flange 45 which extends outwardly in a direction transverse to the cup portion 44. The underside of the flange portion 45 is engaged by a spring 47 which surrounds the carriage 43.

The seat portion 44 of carriage 45 in conjunction with the block 30 can support and guide the wedge element 37 and stabilize its movement.

The spring 47 is of the compression type and is positioned between the flange 45 of the carriage 43 and the bottom of bore 12. The spring 47 urges carriage 43 to a position wherein the upper surface of wedge element 37 contacts the bottom of plunger recess 22 if no opposing pressure is applied to the tappet. The bottom of recess 22 and the retaining ring 16 prevent the spring 47 from ejecting the wedge element from the body 11. This fully extended position of the carriage and wedge block 37 carried thereby is shown in FIG. 1. The carriage and wedge are allowed to move in the area between the guide block and the bottom of the bore as allowed by the spring.

Figure 3:
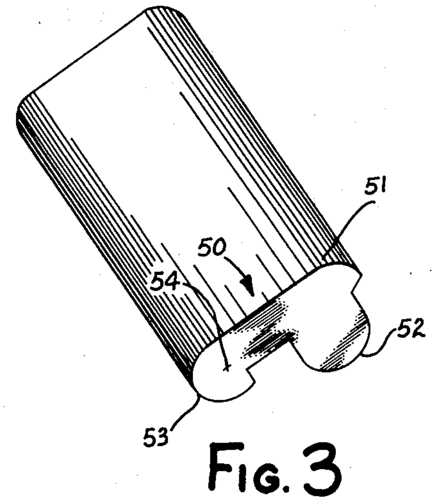
FIG. 3 is a perspective view of a cam which forms a part of the self-adjusting mechanism.

A generally P-shaped cam member 50 is shown in perspective in FIG. 3. The lower portion of the cam member 50 is formed into a pocket engaging surface 53. The pocket engaging surface 53 seats within the pivot pocket 33 of the block 30. The cam member 50 is not attached to the block 30 but pivots about an imaginary axis 54. Opposite the surface 53 on the cam member 50, is a plunger engaging surface 51. This is a generally cylindrical surface, as is the surface 53, and is adapted to engage a surface of plunger 20. A semicircular wedge engaging surface 52 projects substantially transversely from the cam member 50. The wedge engaging surface 52 cooperates with the cam surface 40 of wedge blade 38, and causes the cam to pivot upon longitudinal movement of the wedge blade.

A similar cam member **50*a* is pivotally mounted within pivot pocket 33*a* formed in the block 30. The cam member 50*a* is substantially identical to the cam member 50, having a pocket engaging surface 53*a*, a plunger engaging surface 51*a*, a wedge engaging surface 52*a*, and an imaginary axis of rotation 54*a*.**

Figure 2:
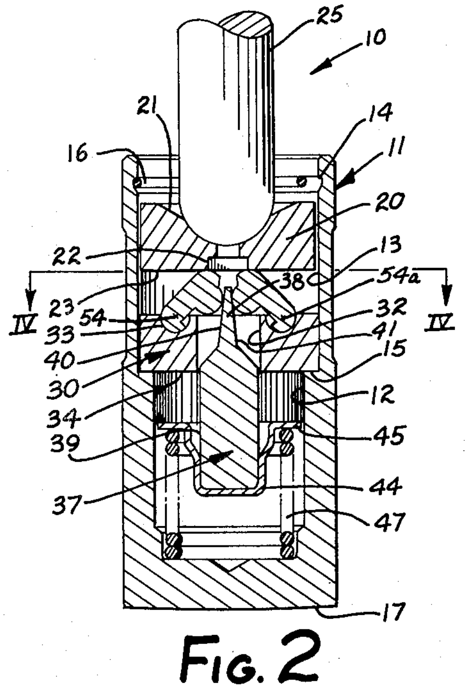
FIG. 2 is a side elevation view as shown in FIG. 1 but with the adjusting mechanism in retracted position.

The cam members 50 and **50*a* are mounted in the pivot pockets 33 and 33*a*, respectively, in such a manner that the wedge engaging surfaces 52 and 52*a* face each other and are separated by wedge blade 38. The centers of gravity of the cam members 50 and 50*a* are always inward or toward the wedge blade and between the imaginary pivot axes 54 and 54*a*. This is true regardless of whether the wedge member is extended as shown in FIG. 1, or retracted as shown in FIG. 2. The particular configuration of the cam members 50 and 50*a* assures that the weight or center of gravity is always distributed inside the imaginary axes 54 and 54*a* due to the protrusions 52 and 52*a*.**

A plunger 20 is slidably disposed within the counterbore 13. The plunger 20 is a generally disk-shaped member having a lower surface 23 which engages the plunger engaging surfaces 51 and **51*a* of the respective cam members and an upper dish-shaped seating surface 21 which provides a seat for the push rod 25. The plunger 20 has a centrally disposed recess 22 which allows the wedge blade 38** to project therein when the wedge element 37 is in its fully extended position (FIG. 1). The retainer ring 16 disposed within the groove 14 prevents the plunger from escaping the counterbore 13. The retaining ring 16 is a spring-like member which snaps within the groove 14 and overlies the plunger 20.

Figure 5:
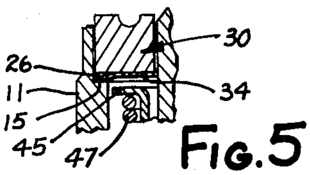
FIG. 5 is a segmental view showing a modified form of the invention.

FIG. 5 shows a modified form of the invention. In the modification a Belleville spring 26, or equivalent resilient member, is positioned between the shoulder 15 of body 11 and the lower surface 34 of guide block 30. Under certain conditions to be described subsequently, the Belleville spring 26 acts upon the cam members 50 and 50*a*, which in turn act upon the wedge blade 38 to overcome the compression of spring 47 and cause a predetermined clearance in the valve train. Positioning the resilient member elsewhere in the valve train does not alter the inventions.

*Modifications*

Figure 6:
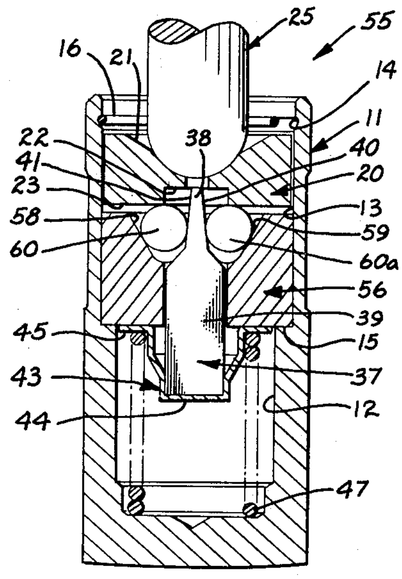
FIG. 6 is a side elevational view, taken in cross section, of a modified form of a self-adjusting tappet showing the adjustment mechanism in the extended position.
Figure 7:
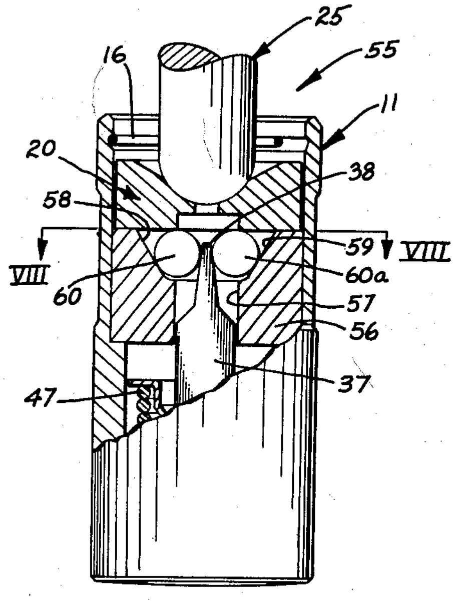
FIG. 7 is a side elevational view as shown in FIG. 6 but with the adjusting mechanism in the retracted position.
Figure 8:
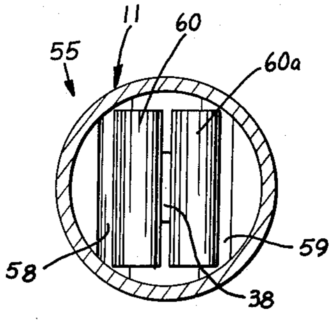
FIG. 8 is a cross sectional view taken along the section lines VIII—VIII of FIG. 7.

FIGS. 6 through 8 inclusive, show a modified form of the mechanical self-adjusting tappet and is designated generally as 55. The modified form of the invention is similar to the assembly 10 except for the guide and retainer block and cam members associated therewith. Therefore, only the guide and retainer block and cam members will be explained in detail.

The guide and retainer block 56 (FIG. 6) is a generally disk-shaped member as is the block 30. Block 56 has a centrally disposed aperture 57 which acts as a guide means for the wedge element or block 37. Cam surfaces 58 and 59 are formed in the top surface of the guide block 56 as best shown in FIG. 8. The cam surfaces 58 and 59 are inclined from the vicinity of the guide passage 57 and extend outwardly to the top of the guide block 56. The cam surfaces 58 and 59 are diametrically opposed to each other, and have generally parallel disposed surfaces.

The cam members 60 and 60*a* are conventional roller bearing elements. The cam member 60 engages the cam surface 58, wedge blade surface 41, and plunger bottom 23. The cam member 60*a* is disposed oppositely from the cam member 60 and engages the surface 40 of the wedge blade, the cam surface 59 of the guide block and another portion of the plunger bottom 23. Extension of the wedge block 37 will cause the roller cam members 60 and 60*a* to travel up the cam surfaces 58 and 59 and thus cause movement of the plunger 20 to adjust for variations in length.

The cam members 60 and 60*a* have an advantage over the pivotal type cam members 50 and 50*a* of the mechanical self-adjusting tappet assembly 10, in that they are obtainable from regular roller bearing stock. The cam members 50 and 50*a* must be specially made; therefore, the mechanical self-adjusting tappet assembly 55 is decidedly more economical to manufacture than is the assembly 10. A further advantage of the self-adjusting mechanical tappet assembly 55 is that greater length of travel is available between the extended and contracted position than is available with the assembly 10 arrangement. This is apparent from the drawing wherein it can be seen in FIG. 6 that the cam surfaces 58 and 59 are of considerable length allowing a greater distance of travel than is obtainable by the pivotal movement of the cams 50 and 50*a* which are limited to the arc generated by the rotation of the pivot members.

Figure 9:
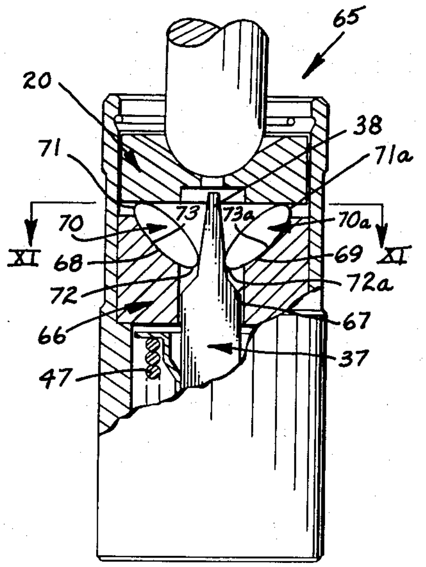
FIG. 9 is a side elevational view taken in cross section of still another modified form of self-adjusting tappet.

Another modified form of the invention is shown in FIG. 9 and is designated generally as 65. The mechanical self-adjusting tappet 65 is similar to that of the assembly 10 except for the guide block and cam members. Therefore, only these elements will be explained in detail.

Figure 11:
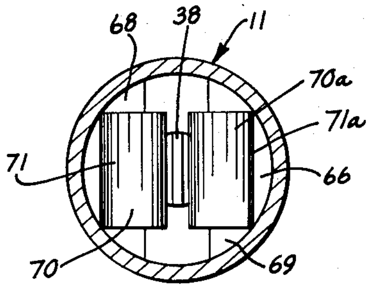
FIG. 11 is a cross sectional view taken along the section lines XI—XI of FIG. 9.

The guide and retainer block 66 of the assembly 65 is generally disk-shaped as are the blocks 30 and 56 previously described. The block 66 has a centrally disposed aperture 67 which provides a guide passage for the wedge element 37. It is provided with cam surfaces 68 and 69 which are inclined and project outwardly from the guide passage 67 and extend to the top of the block 66. These cam surfaces are somewhat similar to the cam surfaces 58 and 59 of the assembly 55; however, differ in that they are slightly concave for purposes which will be explained subsequently. As shown in FIG. 11, the cam surfaces 68 and 69 are diametrically opposed, and extend across the block 66.

Generally elongate elliptic-shaped cam members 70 and 70*a* are disposed so as to slide on the cam surfaces 68 and 69. The cam member 70 has a wedge blade engaging surface 72 and a plunger engaging surface 71. the cam surface engaging surface 73 of the cam member 70 is somewhat convex in shape and is of a design similar to the concave shape of the cam surface 68, and is in sliding contact therewith as shown in FIG. 9. The cam member 70*a* is similar in shape to that of the cam member 70 and has a wedge blade engaging surface 72*a*, a plunger engaging surface 71*a* and a cam surface engaging surface 73*a*. Extension of the wedge block 37 causes the blade 38 to slide the cam member 70 and 70*a* on the cam surfaces 68 and 69 respectively, and extend the plunger 20.

Figure 10:
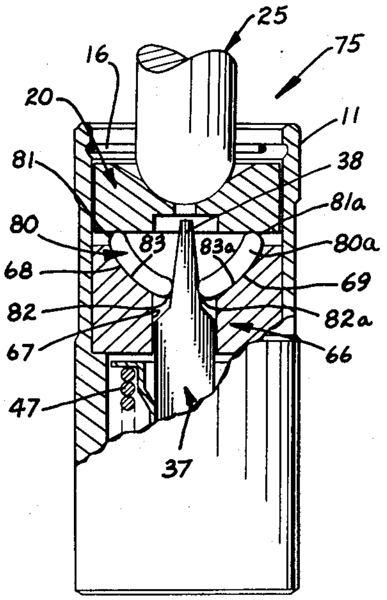
FIG. 10 is a side elevational view taken in cross section of yet another modified form of self-adjusting tappets.
Figure 12:
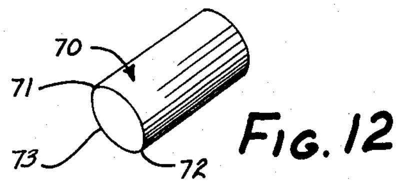
FIG. 12 is a perspective view of an elongate-elliptic-shaped cam member.

FIG. 10 shows still another modification of a self-adjusting tappet assembly designated generally as 75. The assembly 75 is similar to that of the assembly 65 except for the cam members. Therefore, only the cam members will be explained in detail.

Figure 13:
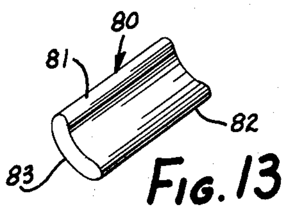
FIG. 13 is a perspective view of an elongate-kidney-shaped cam member.

The cam members 80 and 80*a* are generally elongate kidney-shaped members one of which is shown in perspective in FIG. 13. The cam member 80 has a plunger engaging surface 81 and a wedge blade engaging surface 82. The cam surface engaging surface 83 of the cam member 80 is generally convex in shape and is similar in design to the concave shape of the cam surface 68.

The cam member 80*a* is similar in design to the cam member 80 and has a plunger engaging surface 81*a*, a wedge blade engaging surface 82*a* and a cam surface engaging surface 83*a* which cooperates with the cam surface 69 of block 66.

The elongate elliptic-shaped cam members 70 and 70*a* and the elongate kidney-shaped cam members 80 and 80*a* provide an advantage over either of the pivotal cam members 50 and 50*a* or the roller cam members 60 and 60*a*. This advantage is that the plunger engaging surfaces 71 and 71*a*, 81 and 81*a* of the respective cam members contact the plunger 20 at points substantially further away from the center of the plunger 20 than in the assemblies 10 and 55. This arrangement provides for a more stable push rod seat platform in the form of the plunger 20 than is available with the assemblies 10 and 55.

The kidney-shaped cam members 80 and 80*a* have an advantage over the elongate elliptic-shaped cam members 70 and 70*a* in that they require less material. Therefore, the elongate kidney-shaped cam members provide a more economical design than do the elongate elliptic-shaped cam members.

Figure 14:
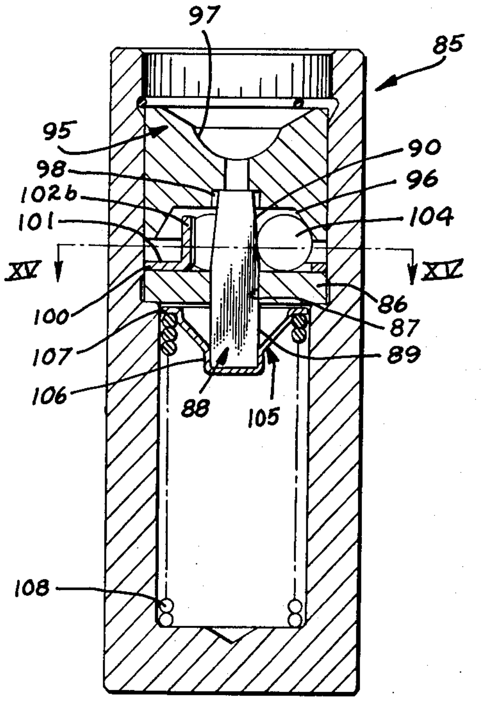
FIG. 14 is a side elevational view taken in cross section of another modified form of self-adjusting tappet.
Figure 15:
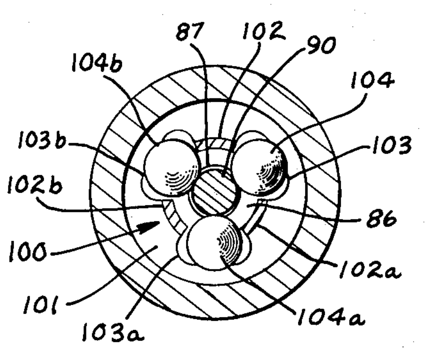
FIG. 15 is a cross sectional view taken along the section lines XV—XV of FIG. 14.

FIGS. 14 and 15 show yet another modified form of self-adjusting tappet assembly designated generally as 85. The body of the assembly 85 is substantially similar to the body of assembly 75. Therefore, only the self-adjusting mechanism of the assembly 85 will be explained in detail.

A disk-like guide and cam element retainer block 86 is disposed within the bore of the tappet. A centrally disposed circular guide passage 87 is formed transversely through the block 86 and provides a guide for a wedge element 88.

The wedge element 88 has a right cylindric shaped trunk portion 89, and a wedge surface 90 which is in the shape of the frustrum of a cone. The trunk 89 is slidably disposed in the guide passage 87 and its movement is directed thereby.

The angle of the wedge surface 90 of wedge element 88 ranges from between 5 to 6½ degrees with respect to an imaginary axis passing through the center of the longitudinal extent of the wedge element. The reason for this particular angle is the same as explained with regard to wedge element 37 of the previous embodiments.

A plunger 95 is also slidably disposed in the bore of the valve tappet and is positioned above the guide block 86 and wedge element 88. The plunger 95 is also generally of a disc-shaped design having substantial thickness.

A cam surface 96 is formed in the base of the plunger 95, and has a general configuration of that of the frustrum of a cone. The cam surface 96 is positioned in the plunger 95 so that it flares outwardly and downwardly toward the body of the valve tappet placing the large dimension at the base of the plunger.

A recess 98 is formed in the plunger 95, and is countersunk with respect to the cam surface 96. The recess 98 provides more working area for the wedge element 88.

The top of the plunger 95 is provided with a push rod seat 97 which is adapted to accommodate the push rod of the valve train mechanism.

A cage 100 is disposed within the valve tappet bore between the guide block 86 and plunger 95. The cage 100 has a bottom which is generally in the shape of a washer. Retainer fingers 102, **102*a* and 102*b* are disposed at equally spaced 120 degree intervals about the inner opening of the bottom and project upwardly therefrom at approximately a right angle. The fingers 102, 102*a* and 102*b* are spaced apart a sufficient distance to allow cam members to operate between each of the fingers. Apertures 103, 103*a* and 103*b* are formed in the cage bottom and are of sufficient size to allow the cam members to engage the guide block 86**.

Ball cam members 104, **104*a* and 104*b* are positioned between the guide block 86 and plunger 95, and are spaced at 120 degree intervals about the wedge element 88 by the cage fingers 102, 102*a* and 102*b*. Ordinary ball bearings may be utilized for the ball cam members 104, 104*a* and 104*b*. The ball cam members are of sufficient diameter so that portions of the outer periphery thereof at all times engage the cam surface 96, the guide block 86 and the wedge surface 90 of wedge element 88**.

A carriage 105 is slidably disposed in the bore of the valve tappet body below the block 86. The carriage 105 is generally cup-shaped in configuration and the bottom 106 thereof is cylindrical in design and of a dimension to snugly receive the trunk 89 of wedge element 88. The trunk 89 of wedge element 88 is thus seated in the bottom of the carriage 105 and supported thereby. The lip portion of the cup-like carriage 105 is in the form of a flange 107.

A compression spring 108 is positioned between the bottom of the valve tappet bore and the flange 107 of carriage 105. The spring 108 constantly urges the carriage and thus the wedge element 88 toward the plunger 95. The purpose for this will be explained more fully hereinafter.

Figure 16:
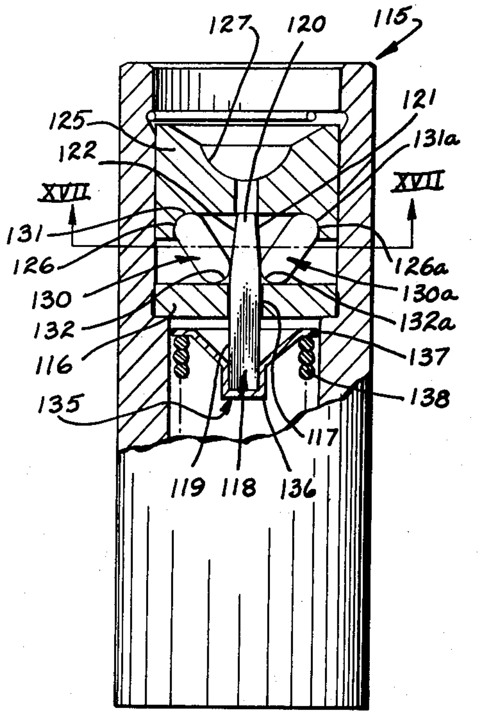
FIG. 16 is a side elevational view, a section of which is taken in cross section of yet another modified form of self-adjusting tappet.
Figure 17:
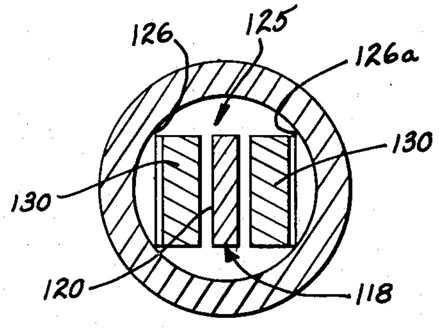
FIG. 17 is a cross sectional view taken along the section lines XVII—XVII of FIG. 16.
Figure 18:
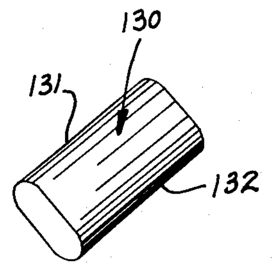
FIG. 18 is a perspective view on an elongate oblong cylindric cam member.

FIGS. 16, 17 and 18 show another modification of a self-adjusting tappet assembly designated generally as 115. The valve tappet body of the self-adjusting tappet assembly 115 is similar to that of the previous modifications and therefore will not be explained in detail.

A guide and retainer block 116 is disposed within the bore of the valve tappet body. The guide block 116 is of a disc-like configuration, and has a centrally disposed guide passage 117 which extends transversely therethrough. The guide passage 117 is of a rectangular configuration and is utilized to direct a wedge element 118.

The wedge element 118 has a rectangular shaped shank portion 119 which is slidably disposed within the guide block passage 117 and is directed thereby.

The top of the wedge element 118 is in the form of a wedge blade 120 which has wedge surfaces 121 and 122 that taper from the shank 119 toward a blunt point. The angle of inclination of wedge surfaces 121 and 122 with respect to an imaginary axis passing through the center of the longitudinal extent of the wedge element ranges from between 5 to 6½ degrees as in previous embodiments.

Also slidably disposed is the valve tappet body bore and positioned above the block 116 and wedge element 118 is a plunger 125. The plunger 125 is also generally of a disc-like configuration. The base portion of the plunger 125 has cam surfaces 126 and **126*a* formed therein. These cam surfaces extend across the entire base of the plunger 125** and form a trough-like groove in the base of the plunger as best shown in FIGS. 16 and 17.

A push rod seat 127 is formed in the top of the plunger 125 and is adapted to receive the push rod of the valve train mechanism.

Elongate oblong-cylindric cam members 130 and **130*a* are positioned between the block 116 and the plunger 125. The configuration of the cam members 130 and 130*a* is shown in FIG. 18. The cam members 130 and 130*a* have cylindric plunger engaging surfaces and guide block and wedge engaging surfaces 131, 132 and 131*a* and 132*a* respectively. As best shown in FIG. 16, the plunger engaging surface 131 of cam member 130 engages the cam surface 126 of plunger 125, and the guide block and wedge engaging surface 132 engages the top of the block 116 and the wedge surface 122. The plunger engaging surface 131*a* of cam member 130*a* engages the cam surface 126*a* of plunger 125, and the guide block and wedge engaging surface 132*a* engages the block 116 and wedge surface 121**.

As best shown in FIG. 17 the wedge blade 120 is of the same width dimension as the cam members 130 and **130*a*. Thus, the entire wedge engaging surfaces 131*a* and 132*a* of the cam members have bearing engagement with the wedge blade surfaces 121 and 122. This arrangement results in longer wear than that shown in assembly 55 wherein the cam members 60 and 60*a* have only partial bearing contact with the wedge blade 38 of wedge element 37. This is due to reduced unit loading. Another reason for this is that in the assembly 55 ends of the cam members 60 and 60*a* tend to oscillate creating a tendency for the cam members to lock with the wedge element. However, in the assembly 115 the ends of the cam members cannot oscillate since they are supported by the wedge element 118**.

Upward movement or extension of the wedge element 118 causes the cam members 130 and **130*a* to spread and extend the plunger 125. Downward movement or retraction of the wedge element 118** takes place when the cam members close due to uneven loading and vibration on the valve train.

A cup-like carriage 135 is positioned between the bottom of the guide block 116 and the bottom of the bore formed in the valve tappet body. The bottom 136 of the carriage 135 is channel shaped in design and of a dimension to snugly receive the trunk 119 of wedge element 118. The lip portion of the cup-like carriage 135 is in the form of a flange 137 which is turned outwardly from the carriage.

A compression spring 138 is positioned between the carriage flange 137 and the bottom of the bore formed in the valve tappet body. The spring 138 constantly urges the carriage 135, and in turn the wedge element 118, outwardly or to the extended position.

Figure 19:
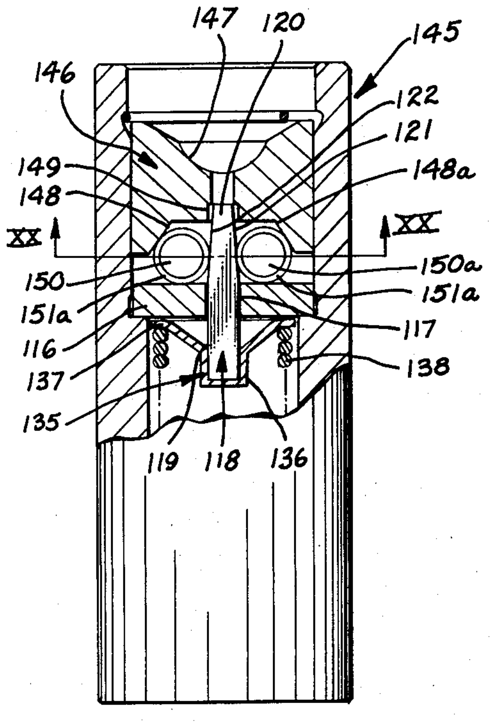
FIG. 19 is a side elevational view, a segment of which is taken in cross section, of still another modified form of self-adjusting tappet.
Figure 20:
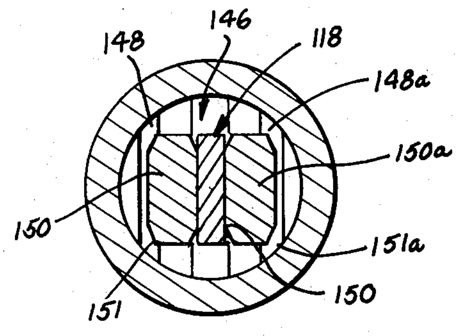
FIG. 20 is a cross sectional view taken along the section lines XX—XX of FIG. 19.

FIGS. 19 and 20 show still another modification of a self-adjusting tappet assembly designated generally as 145. The body, guide and retainer block, wedge element, carriage and spring of the self-adjusting tappet assembly 145 is substantially similar to that of the self-adjusting tappet assembly 115. The difference between the assemblies 115 and 145 lies in the construction of the plunger and cam members. Therefore, only the plunger and cam members of the assembly 145 will be explained in detail.

The plunger 146 is generally disc-shaped in configuration and is of substantial thickness. The plunger 146 is slidably disposed in the bore of the valve tappet body and is positioned above the block and wedge element.

Cam surfaces 148 and 148a are formed in the base of the plunger 146 and extend completely thereacross forming a trough-like groove. Cam surfaces 148 and 148a are tapered and flare downwardly and outwardly toward the body of the valve tappet.

A recess 149 is centrally disposed in the trough-like groove and is countersunk with respect thereto. The recess 149 provides for greater movement of the wedge element.

A push rod seat 147 is formed in the top of the plunger 146 and is adapted to receive a push rod (not shown) which forms a part of the valve train mechanism.

Roller cam members 150 and 150a are positioned between the plunger 146 and the guide block 116. The roller cam members may be standard roller bearings. The ends of the roller cam members 150 and 150a have chamfer 151 and 151a respectively. The chamfered ends of the roller cam members prevent possible jamming of the rollers with the bore of the valve tappet body. The roller cam members 150 and 150a are of sufficient diameter so that portions of the circumferences continuously engage the cam surfaces 148 and 148a, the wedge surfaces of the wedge element and the top of the guide block.

The cam rollers 150 and 150a are the same width as the blade 120 of wedge element 118 thus providing bearing support for the cam member in a manner similar to the assembly 115.

Upward movement or extension of the wedge element will cause movement of the roller cam members 150 and 150a which will be transferred to the plunger 146 and result in extension of the plunger. Downward movement of the roller cam members due to increased pressure on the plunger by the valve train will force wedge element to yield downwardly in minute increments during engine operation.

Although not shown, it is to be understood that a Belleville spring 26 can be used with each of the assemblies 55, 65, 75, 85, 115 and 145 in a manner similar to its use shown or described with the assembly 10.

*Assembly*

The self-adjusting mechanical valve tappet of this invention is assembled in the following manner. The spring 47 is seated in the bore 12 of the tappet body 11. A carriage 43 is positioned upon the spring 47 so that its flange 45 engages the top of the spring. The guide and retainer block 30 is then fitted in position so that the lower surface 34 thereof abuts shoulder 15 of body 11. The wedge block 37 is then passed through guide passage 32 and fitted in cup 44 of carriage 43. The wedge element 37 may be secured to the carriage 43 before the guide block is fitted in positon. Cams 50 and 50a are mounted in pivot pockets 33 and 33a, respectively, of the block 30. The plunger 20 is then inserted in the counterbore 13 and the retainer ring 16 snapped into position which completes assembly of the tappet.

The mechanical self-adjusting valve tappet assemblies 55, 65, 75, 85, 115 and 145 are assembled in substantially the same manner as the assembly 10.

The self-adjusting valve tappet assembly 10 or assemblies 55, 65, 75, 85, 115 and 145 operate in a valve train between the push rod 25 thereof and the timing cam on a cam shaft (not shown).

FIG. 2 shows the automatic valve adjusting mechanism of the tappet assembly 10 in the retracted position. The spring 47, wedge element 37, cams 50 and 50a, and plunger 20 approach this position when the valve train parts are new and the engine is hot, i.e. when the valve train is relatively long. The spring 47 is compressed to a substantial extent by the pressure exerted thereupon by the valve train structure as shown in the position of FIG. 2.

FIG. 1 shows the automatic adjusting mechanism assembly 10 in the fully extended position corresponding to a cold engine and badly worn valve train. In an actual installation, the carriage 43 will normally assume a position somewhere between that shown in FIG. 2 and that shown in FIG. 1 depending on the wear and temperature involved.

The assemblies 55, 65, 75, 85, 115 and 145 will assume similar positions under similar operating conditions.

*Operation*

Assuming that the engine is cold, the various parts of the valve train will have contracted, and the parts will in effect be shorter. If the valve tappet assembly cam were merely a solid piece between the push rod 25 and the cam shaft (not shown), considerable lost motion or clearance would result between the parts, and the valve train would be noisy. However, with the mechanism of the self-adjusting tappet assembly 10 such lost motion does not result. The spring 47 urges the wedge block 37 upwardly as viewed in FIGS. 1 and 2. This causes the cam engaging surfaces 40 and 41 of wedge blade 38 to coact with the wedge engaging surfaces 52 and 52a of the cams. Since the wedge blade 38 is wedge-shaped, upward movement or extension thereof will force the cams 50 and 50a to spread or move outwardly by pivoting in the pivot pockets 33 and 33a. Pivotal movement of the cam members 50 and 50a increases the effective distance between block 30 and plunger 20. The plunger engaging surfaces 51 and 51a of the cam members engage the bottom surface 23 of the plunger 20 and force the plunger outwardly. Any lost motion between the components of the valve train is automatically compensated for, since the effective length of the valve tappet has been increased in the manner just described.

When the engine warms up the above described series of events takes place in reverse. The plunger 20 acts upon the cams 50 and 50a which rotate inwardly and in turn set upon the wedge element 37 which compresses spring 47 and effectively shortens the valve train linkage. Retraction of the wedge element usually occurs only during engine operation due to the taper angle of wedge blade 38. Uneven loading on cams 50 and 50a, inherent engine vibrations, and slight radial differences between the pocket engaging surfaces 53 and 53a in cam pockets 33 and 33a cause the wedge element 37 to yield downward or retract a slight distance during each engine cycle.

The fact that the wedge element 37 has the lower portion of its trunk 39 supported by the carriage seat 34 and the upper portion of the trunk 39 guided by the aperture 32 in guide block 30 is important in the operation of the device. This double support feature prevents undesirable tipping movement of the wedge element 37. If considerable tipping is permitted between the wedge element 37 and the guide block 30, the wedge element 37 has a tendency to lock in either extended or retracted position. Further, such tipping causes undesirable vibration and resultant wear on the wedge element which further increases the tendency of the wedge element to become locked or wedged in one position.

When the engine is stopped or in the static condition, the angle of wedge blade 38 is such that it will not allow the cams 50 and 50a to rotate toward each other regardless of whether the plunger 20 is near the extended position or the retracted position. The Belleville spring 26, or a similar resilient member, is necessary in certain instances due to this feature. If the engine is hot and allowed to cool to a very cold temperature, the valve train structure will contract and the wedge element 37 will extend under the compression of spring 47, pivoting the cams 50 and 50a and move the plunger to take up the lost motion. If the engine is started in this very cold condition, no lost motion will result. However, if the engine is allowed to set and warms up due to a rise in amtospheric temperature, the valve train structure will again expand but wedge element 37 will not retract.

Since the push rod 25 cannot move the plunger 20 down due to the fact the wedge element will not move, the rocker arm is actuated slightly and the engine valves will be opened slightly. This is undesirable for starting conditions. In this situation the Belleville washer 26 or other resilient member is installed as shown in FIG. 5 or as previously described. The Belleville spring 26 will expand during the time that the engine is cooling (due to the contraction of the valve train structure) and overcome the force of compression spring 47. The force of Belleville spring 26 is sufficiently great so that when its force is transmitted to the wedge blade 38 by the guide block 30 and cams 50 and 50*a*, it will overcome the compression of spring 47 and the mechanical advantage of the wedge angle of blade 38 and prevent movement of the wedge element 37. When the atmospheric temperature rises, the Belleville spring 26 will be depressed (due to expansion of valve train structure) allowing the engine valves to remain closed for easy starting.

During actual engine operation, the Belleville spring will assume a partially compressed position when the tappet is on the base circle of the cam shaft. During the valve open portion of the engine valve cycle, the engine valve spring load will fully compress the Belleville spring. Thus, the cam shaft design may have to be altered slightly to compensate for the few thousandths inch lift loss due to the difference in height of the partially compressed and fully compressed Belleville spring.

As the valve train linkage wears, the spring 47 will take up the lost motion formed in the components in the same manner that lost motion is taken up in a cold engine as described.

The operation of the mechanical self-adjusting tappet assembly 55 is similar to that of the assembly 10 except that a different cam arrangement is used to extend the plunger 20. Thus, in the assembly 55 lost motion in the valve train mechanism is compensated for by the spring 47 urging the wedge block 37 in a direction toward the push rod 25 or in an extended direction. When this occurs the wedge element blade 38 will spread the roller cam members 60 and 60*a* and cause them to roll up the cam surfaces 58 and 59, and the roller cam members 60 and 60*a* will cause movement of the plunger 20.

Due to the angle between the wedge block blade 38 and the roller cam members 60, retraction of the wedge block 37 takes place only when the valve train mechanism is in a dynamic condition as previously described with respect to the cam members 50 and 50*a* of assembly 10.

The mechanical self-adjusting assemblies 65 and 75 also operate in a manner similar to that of the assemblies 10 or 55, except for the particular operation of the elongate elliptic-shaped cam members 70 and 70*a*, and the elongate kidney-shaped cam members 80 and 80*a*. In these arrangements the lost motion of the valve train mechanism is compensated for by movement of the wedge block element 37 toward the push rod 25 or toward the extended position by the spring 47. Extension of the wedge block 37 will cause blade 38 thereof to spread the cam members 70 and 70*a* or 80 and 80*a* depending on the design used, and slide the cam members up the cam surfaces 68 and 69 of the guide block 66. Sliding movement of the cam members will in turn cause movement of the plunger 20 which is in contact with the cam members and thereby compensate for lost motion in the valve train.

The cam members 70 and 70*a* or 80 and 80*a* engage the wedge block blade 38 at an angle so that retraction of the wedge block 37 by increased pressure on the valve train linkage occurs only when the mechanism is in a dynamic or running condition. Thus, the assemblies 65 and 75 are similar to the assemblies 10 and 55 in this respect.

The operation of the mechanical self-adjusting tappet assemblies 85 and 145 is basically similar to that of the assembly 55.

In the assembly 85 lost motion of the valve train mechanism is compensated for by upward movement or extension of the wedge element 88 as a result of the force applied thereto by compression spring 103. Extension of the wedge element 88 causes the wedge surface 90 thereof to coact on the ball cam members 104, 104*a* and 104*b* which in turn act upon the cam surface 96 of plunger 95 to extend the plunger and thus lengthen the valve train. The ball cam members 104, 104*a* and 104*b* have a rolling movement during the extension of the wedge element 88.

The wedge angle 90 and the angle of the cam surface 96 formed on the plunger 95 are such that retraction of the wedge element 88 by increased pressure on the valve train linkage occurs only when the mechanism is in a dynamic or running condition. This arrangement is similar to that of the assemblies previously described.

Extension of the wedge element 118 in assembly 145 causes the wedge surface 121 and 122 thereof to act upon the roller cam members 150 and 150*a* which in turn act upon the cam surfaces 148 and 148*a* formed on the plunger 146. Extension of the wedge element 118 will cause rolling movement of the cam members 150 and 150*a* and extend the plunger 146 taking up any slack in the valve train mechanism.

As in the previous assemblies, the angular arrangement of the cam surfaces 148 and 148*a* and the wedge surfaces 121 and 122 are such that increased pressure on the valve train linkage will retract the wedge element 118 only when the mechanism is in a dynamic condition.

The mechanical self-adjusting tappet assembly 115 is also basically similar in operation to the other assemblies. Thus, upward movement or extension of the wedge element 118 results in the wedges surfaces thereon coacting upon the cam members 130 and 130*a* to extend the plunger 125. However, in the assembly 115 the cam members 130 and 130*a* have a pivotal movement which is more similar in operation to the assembly 10. Thus, extension of the wedge element 118 causes the wedge surfaces 121 and 122 to act upon the wedge and guide block engaging surfaces 132 and 132*a* of cam members 130 and 130*a*. This spreads the cam members 130 and 130*a* and the plunger engaging ends 131 and 131*a* respectively act against the cam surfaces 126 and 126*a* on plunger 125. The cam members 130 and 130*a* are in effect pivoted from an angular position to a more vertical position by the extension of the wedge element 118 thereby increasing the distance between the plunger 125 and guide block 130.

As in the other assemblies, the angle of coaction between the wedge element 118 and the cam members 130 and 130*a* is such that retraction of the wedge element 118 by increased pressure on the valve train linkage occurs only when the mechanism is in a dynamic or running condition.

If the assemblies 55, 65, 75, 85, 115 and 145 are provided with a Belleville spring such as 26 in a manner similar to that shown in FIG. 5 or as previously described, the operation of these assemblies is substantially similar to that of the assembly 10 described above, under similar operating conditions. Therefore, this operation will not again be explained in detail.

It has been found that the automatic self-adjusting valve tappet disclosed herein performs very well throughout the speed range of automotive engines. This valve tappet compensates quickly and efficiently for variations in the valve train linkage due to wear or temperature change. The tappet disclosed herein is compact allowing use thereof where it was previously impossible to use mechanical self-adjusting tappets. Thus the novel spring urged wedge and cam arrangement provides a decided advantage over previous mechanical self-adjusting tappets. This mechanical self-adjusting valve tappet also has certain decided advantages over the hydraulic tappet. The use of mechanical self-adjusting tappets does not make it mandatory to use high detergent oils, such as is the case with hydraulic tappets. The mechanical self-adjusting tappet is not noisy on initial starts in cold weather as are many hydraulic tappets. Even high quality oils upon becoming cold have a tendency not to flow freely and adjustment does not take place immediately since it is dependent on the flow of the oil. Also, the problem of the oil becoming dirty and congesting the hydraulic tappet is not present in the mechanical self-adjusting tappet. Another major advantage in the mechanical tappet is that it can be manufactured more economically, since it is not necessary to keep the close tolerances in mechanical tappets that are necessary in the hydraulic tappet. Thus, the mechanical self-adjusting tappet is a highly competitive article of manufacture.

While a preferred embodiment of this invention has been described, it will be understood that other modifications and improvements may be made thereto. Such of these modifications and improvements as incorporate the principles of this invention are to be considered as included in the hereinafter appended claims unless these claims by their language expressly state otherwise.

We claim:

1. A mechanical self-adjusting tappet comprising; a body having a bore with an open end; plunger means reciprocally disposed within the bore of said body, a plurality of cam elements positioned in said bore inwardly of said plunger means and movable in a direction to cam said plunger means in a direction toward the open end of said bore, and spring urged wedge means slidably disposed within said body and received between and coacting with said cam elements to move said plunger means, said wedge means having cam follower surfaces positioned symmetrically and engaging said cam elements, said surfaces each being tapered at an angle between 5 to 6½ degrees outwardly from the longitudinal axis passing through said wedge means between said cam elements; and the portion of each cam member engaging said wedge means being arcuately convex in configuration.

2. A self-adjusting tappet comprising; a body, said body having an open ended bore; a guide block disposed within said bore, said guide block having a guide passage in which is disposed a wedge element slidable along the axis of said guide passage; said wedge element having an end with tapered surfaces disposed at an angle of from 5 to 6½ degrees with respect to said axis of said guide passage, a carriage positioned in said bore and having a seat for receiving and supporting said wedge element, a spring positioned between the bottom of said bore and said carriage and urging said carriage and wedge element toward the open end of said bore, plunger means slidably disposed within the open end of said bore, cam members movably disposed on the surfaces of said wedge element and being in engagement therewith, said cam members also engaging said plunger means; the extension of said wedge element by said spring causing said tapered wedge surfaces to move said cam members and extend said plunger means and the operative length of said tappet, increased pressure on said plunger means biasing said cam members in a direction tending to retract asid wedge element and compress said spring and the portions of said cam members engaging said wedge element having an arcuate convex configuration.

3. A compensating device for lost motion in valve train mechanism comprising, a self-adjusting tappet having a body, said body having an open ended bore; a guide block disposed within said bore, said guide block having a guide passage in which is disposed a slidable wedge element; said wedge element having a tapered blade disposed at an angle of from 5 to 6½ degrees with respect to an imaginary axis passing through the longitudinal extent of said wedge element, a spring positioned between the bottom of said bore and said wedge element and urging said wedge element toward the open end of said bore, plunger means slidably disposed within the open end of said bore, cam means movably disposed on opposite sides of said wedge element tapered blade and being in engagement therewith, surfaces of said cam means also engaging said plunger means, extension of said wedge element by said spring causing said tapered wedge blade to move said cam means and extend said plunger means and the length of said device, thereby compensating for lost motion; increased pressure on said plunger means biasing said cam means in a direction tending to retract said wedge element and compress said spring.

4. A compensating device for lost motion in valve train mechanism comprising, a self-adjusting tappet having a body, said body having an open ended bore; a guide block disposed within said bore, said guide block having a guide passage in which is disposed a slidable wedge element; said wedge element having a tapered blade with surfaces disposed at an angle of from five to six and one-half degrees with respect to a central axis passing longitudinally through said wedge element, a carriage positioned in said bore and having a seat for receiving and supporting said wedge element, a spring positioned between the bottom of said bore and said carriage and urging said carriage and wedge element toward the open end of said bore, plunger means slidably disposed within the open end of said bore, cam members movably disposed on opposite sides of said wedge element tapered blade and having arcuately convex portions in engagement therewith, a surface of said cam members also engaging said plunger means, extension of said wedge element by said spring causing said tapered wedge blade to move said cam members and extend said plunger means and the length of said device, thereby compensating for lost motion; and increased pressure on said plunger means biasing said cam members in a direction tending to retract said wedge element and compress said spring.

5. A mechanical self-adjusting tappet comprising a body; a push rod engaging plunger reciprocally disposed within an open ended bore formed in said body; a guide block disposed in said bore and having a guide passage slidably receiving a wedge member, cam members pivoted on said guide block and having arcuately convex surfaces engaging said plunger and said wedge member; resilient means engaging said wedge member and urging the same to pivot said cam members for moving said plunger and said wedge member having surfaces engaged by said cam members tapered at an angle of between five and six and one-half degrees with respect to a central axis extending longitudinally of said wedge member.

6. A compensating device for lost motion in valve train mechanism comprising; a self-adjusting tappet having a body which contains mechanism capable of adjusting the effective length thereof, said mechanism including a spring-biased longitudinally movable wedge element having surfaces at an angle of between five and six and one-half degrees with respect to an axis extending longitudinally of said wedge element; a plurality of pivotally mounted cam elements having arcuately convex portions engaging said wedge element; and plunger means cooperating with said cam elements; movement of said wedge element causing said cam elements to pivot so as to extend said plunger means when said valve train mechanism is in a static or dynamic condition, the movement of said mechanism varying the length of said tappet according to the variations of pressure applied thereto by operation of said valve train mechanism, reverse movement of said wedge element normally occurring only when said valve train mechanism is in a dynamic condition.

7. A compensating device for lost motion in valve train mechanism comprising, a self-adjusting tappet having a body, said body having a closed end, a bore, and an open ended counterbore, a guide block positioned within said counterbore, said guide block having a guide passage in which is disposed a slidable wedge element, said wedge element having a tapered blade having surfaces at an angle of between five and six and one-half degrees with respect to the longitudinal axis of said wedge element, a spring positioned between the bottom of said bore and said wedge element and urging the same toward said open end of said counterbore; at least a pair of cam members pivotally mounted on said guide block at diametrically opposite points, the centers of gravity of said cam members being so positioned with respect to their pivotal mounting points that said cam members tend to move toward each other under the influence of gravity, said cam members having arcuately convex wedge engaging surfaces contacting said wedge blade and plunger engaging surfaces contacting a plunger slidable within said counterbore, extension of said wedge element by said spring causing said tapered wedge blade to pivot said cam members away from each other and extend said plunger and the length of said device thereby compensating for lost motion, increased pressure on said plunger biasing said cam members in a direction tending to retract said wedge element and compress said spring.

8. The tappet in claim 6 wherein additional spring means in said body exert a bias on said wedge element to retract said wedge element when said valve train mechanism is subject to retraction and expansion in the static condition.

9. The tappet in claim 3 wherein said guide block includes cam surfaces, and said cam means comprises rolling members engaging said cam surfaces, said wedge element, and said plunger.

10. The tappet in claim 9 wherein said guide block includes a central guide passage receiving said wedge element, and said cam surfaces are inclined toward said guide passage.

11. The tappet in claim 1 wherein said plunger includes cam surfaces engaging said cam elements.

12. The tappet in claim 11 wherein said cam elements are ball cam members positioned in cage means.

13. The tappet in claim 3 wherein said cam means includes a plurality of cam elements, each of which is generally P-shaped, has a first, convex, pocket-engaging surface fitting within a pivot pocket in said guide block, has a second convex surface on the opposite end of said cam element from said first convex surface, engaging said plunger means, and has a third convex surface between said first and second surfaces, and engaging said wedge element.

References Cited in the file of this patent

UNITED STATES PATENTS

| | | |
|---|---|---|
| 1,531,909 | Engemann | Mar. 31, 1925 |
| 1,663,345 | Lievre | Mar. 20, 1928 |
| 1,807,719 | Williams | June 2, 1931 |
| 2,116,109 | Fisk | May 3, 1938 |
| 2,158,730 | Russell | May 16, 1939 |
| 2,234,718 | Anglada | Mar. 11, 1941 |
| 2,326,780 | Howard | Aug. 17, 1943 |
| 2,615,439 | Humphreys | Oct. 28, 1952 |